June 21, 1938.  O. E. KOEHLER  2,121,435
METHOD OF MANUFACTURING THREADING DIES
Filed Sept. 11, 1936
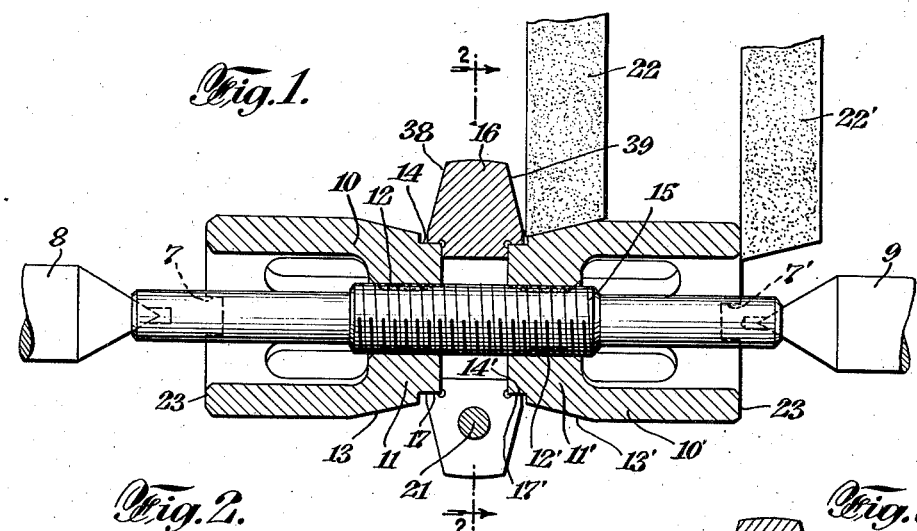
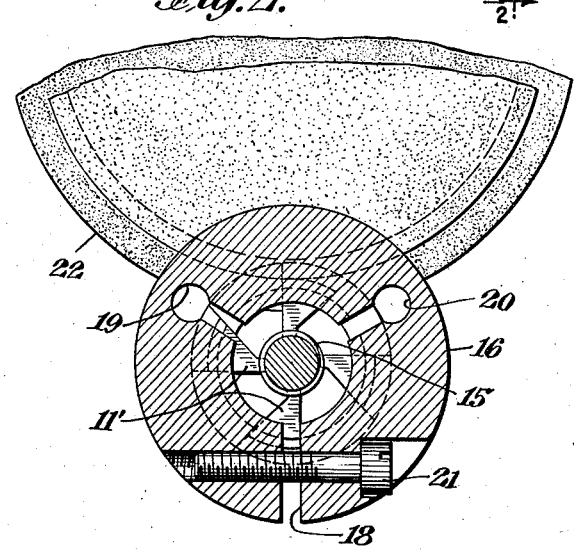
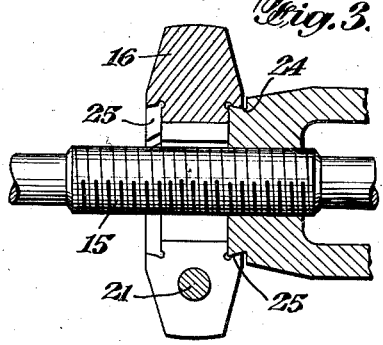
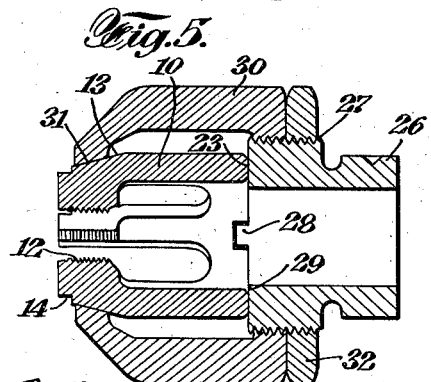
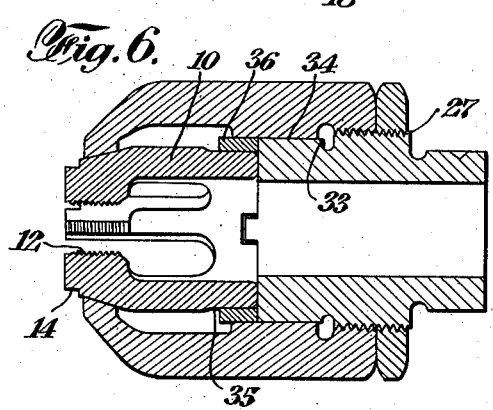
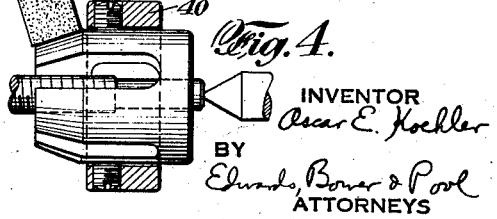
INVENTOR
Oscar E. Koehler
BY
Edwards, Bower & Pool
ATTORNEYS Patented June 21, 1938

2,121,435

UNITED STATES PATENT OFFICE 2,121,435

METHOD OF MANUFACTURING THREADING DIES

Oscar E. Koehler, Greenfield, Mass., assignor to Greenfield Tap and Die Corporation, Greenfield, Mass., a corporation of Massachusetts Application September 11, 1936, Serial No. 100,228

3 Claims. (Cl. 76—101)

This invention relates to thread cutting dies and particularly to dies of the spring or prong type for use in holders adapted to adjust the cutting edges of the die by relative movement of parts of the holder.

The object of the invention is to provide a die in which the cutting edges are accurately positioned with relation to the holder parts to give precise centering and adjustment of these cutting edges in service.

In prior practice the die bevel and inner seat surfaces intended to cooperate with the die holder have been finished before the formation of the threads and prongs and before the final heat treatment with the result that in the final die the cutting edges might occasionally be misaligned with relation to the die bevel and seat, and such a die would not properly cooperate with the holder to give precise co-axial relation between the cutting edges and the center line of the holder.

The danger of such mis-alignments is minimized according to this invention by a novel arrangement and method for cutting the threads and grinding the surfaces of the die which engage the holder.

The invention will be understood from the following detailed description and reference to the accompanying drawing of which:

Fig. 1 illustrates an arrangement for making dies according to this invention;

Fig. 2 is a transverse sectional view taken at line 2—2 of Fig. 1;

Fig. 3 shows a detail which may be substituted for apparatus in Fig. 1;

Fig. 4 shows a die clamping detail which might be substituted for that shown in Figs. 1 to 3;

Fig. 5 shows a die made according to this invention, assembled in its holder; and Fig. 6 shows an alternative assembly arrangement.

Figs. 1 and 2 show two unfinished dies 10 and 10' each having four lands or prongs 11 and 11', respectively, formed by cutting out longitudinal slots in the die blank so that the resulting prongs have a degree of resilience. The inner surfaces of the prongs or lands of the two dies are provided with cutting teeth 12 and 12', respectively, which are cut before the die is hardened, and may be formed in any well-known manner as by a hob. The dies have the bevels 13 and 13' at the front of the prongs, as is usual in this type, so that when pressure is applied to them by the usual holder cap they are strained inwardly, regulating the depth of the thread cut. At the fronts of the bevels, there are formed shoulders 14 and 14', the function of which will presently appear.

To carry out the method of manufacture according to this invention, after the threads are formed the dies will ordinarily be hardened by heat treatment. Then the dies are screwed on a short mandrel 15 with their beveled ends facing each other and spaced apart by the proper distance to receive a collar 16 having a pair of shoulders 17 and 17' which fit over shoulders 14 and 14', respectively, of the dies, as shown. The collar is provided with a transverse split 18 and cut-outs 19 and 20 (Fig. 2) which furnish circumferential resilience. A clamping screw 21 at the split serves to reduce the collar diameter when tightened, thereby pressing all the die prongs inwardly and firmly clamping the die on the mandrel to prevent relative rotation at the threads.

As thus assembled the mandrel is set up between the headstock and tailstock, 8 and 9, of a grinder and rotated in a well-known manner. At the same time a grinding wheel 22 having a grinding edge of the proper conical shape is brought to bear against the bevel 13', as shown, thereby finishing the bevel, with reference to the die threads. The oblique surfaces 38 and 39 of the collar facilitate the use of the grinding wheel on the die bevel, because an operator is enabled readily to view the work. The seat end 23' of the die is ground with reference to the die threads by moving the grinding wheel to the position 22' and using the side of the wheel. To grind the corresponding surfaces of die 10, the mandrel can be turned over, and the same grinding operations performed by wheel 22. It would be possible, of course, to grind both bevels in one machine and both ends in another. It would also be possible to grind both bevels and ends with four wheels in the same machine.

The arrangement of two dies on the mandrel is very helpful for it overcomes any tendency for the collar to slip off the narrow shoulder of the die while being tightened down. The arrangement could, if desired, be used with only one, instead of two, dies, but the use of the collar on only one die would be facilitated by tapering the die shoulder inwardly at about 3 to 5 degrees as shown at 24 in Fig. 3. In this case the shoulder 25 of the collar would have a corresponding taper.

This apparatus and method can be used even in dies which for one reason or another are not permitted to have an appreciable shoulder. The die blank can be made with a sufficiently wide shoulder and the die completed according to the above described practice, and then the shoulder can be ground off or removed. It might be possible to use a mandrel having no threads but having a diameter the size of the minor thread diameter.

Fig. 4 illustrates another arrangement for clamping the die on the mandrel. A collar 40 is placed over the straight part of the die over the fluted section just back of the bevel, and the die teeth are pressed on the mandrel by individual set screws 41 for the die prongs. This method of clamping is not as effective as the arrangement of Fig. 3 but it constitutes an easy way of obtaining traverse motion of a cylindrical grinding wheel 42 parallel to the bevel. Traverse motion of a cylindrical grinding wheel would also be possible in the arrangement of Fig. 3 because of the oblique surfaces 38 and 39 of the collar 16.

Fig. 5 illustrates an assembly of a die made according to this invention, in a die holder. The die holder is of a known type comprising a hollow driving shank 26 provided with threads 27 cut co-axially with reference to the cylindrical driving stem, and with driving lugs 28 on its faced end 29 to engage the driving slots 7 of the die. The end 29 is finished perpendicular to the axis with reference to the threads 27. A hollow cap 30 is screwed on the threads 27 of the shank and is provided at its outer end with a circular opening 31 finished concentrically with reference to its threads. The seat 23 of the die is held against the end face 29 of the shank by pressure of circular opening 31 on bevel 13. The cut of the threads is adjusted by the degree to which the cap is turned down on the threads 27, for the further the cap is screwed down the smaller becomes the diameter of the die threads. After the cap is adjusted it is held in adjustment by a lock nut 32 turned down against the inner end of the cap on the threaded shank.

Fig. 6 shows a refinement of the assembly arrangement shown in Fig. 5. The driving shank is provided with an elongated outer end the surface 33 of which is ground concentric with reference to its threads 27. The cap is extended back to be threaded over the threads of the shank and is provided with an inner peripheral surface 34 ground concentric with reference to its threads to fit nicely over surface 33 without appreciable play. The die 10 is the same as that made according to Figs. 1 and 2, but the rear portion of its circumference is ground at 35 with reference to its threads 12. In assembling the die in its holder, a bushing 36 is fitted snugly but slidably around the circumference 35.

According to prior practice, dies have been made by grinding the bevel and seat and cutting out the slots and then mounting the die blank in a holder similar to that shown in Fig. 5 to cut the teeth, prior to heat treatment. The ground surfaces constituted the logical holding means so the threads were cut with reference to them. Such dies would occasionally be found in slight misalignment with the driving shanks of the holders, when assembled, because of occasional inaccuracies in the thread cutting, and possible warping during the heat treatment.

This invention, on the other hand, provides means for holding the die by its cut teeth and then finishing the holding surfaces with reference to them. Dies made according to this invention have the advantage that misalignment of the cutting teeth with reference to the axis of the holder, is minimized. Since the bevel 13 and seat 23 are faced with reference to the cutting teeth themselves, alignment with the holder axis follows. Such alignment of the holder apparatus substantially results from the fact that the holder edge 29 is ground with reference to threads 27 and the holder axis, and that cap opening 31 is ground with reference to the cap threads. Any tendency of the die prongs to spring out unevenly is corrected by the cap opening 31 which forces them to a uniformly centered position.

In the assembly arrangement of Fig. 6 the close sliding fit of the piloting surfaces 33 and 34 and bushing 36 and the cap and shank threads at 27 all cooperate to hold the die in alignment.

I claim:

1. The method of making a prong die which comprises cutting the teeth on the prongs of a die blank before hardening, then heat-treating the die blank to harden it, then clamping said teeth on an arbor, and grinding the die seat and bevel while on said arbor.

2. Method of making pronged dies comprising forming the teeth on the prongs of a die blank before hardening, then hardening said teeth, gripping the hardened teeth of the die upon a mandrel and clamping the prongs of the die with a collar to tighten the die on the mandrel and with the die so internally and externally held grinding a bevel on the outer surface of the die so as to accurately relate said bevel to the die teeth.

3. Method in accordance with claim 2 in which the final external grinding of the die includes both the bevel on the outer surface and the seat at the end of the die so as to accurately relate both the bevel and the seat to the die teeth.

OSCAR E. KOEHLER.